United States Patent
Huang

(10) Patent No.: US 9,256,248 B2
(45) Date of Patent: Feb. 9, 2016

(54) PROTECTING DEVICE FOR TABLET DEVICE

(71) Applicant: HON HAI PRECISION INDUSTRY CO., LTD., New Taipei (TW)

(72) Inventor: Fu-Kuo Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/510,728

(22) Filed: Oct. 9, 2014

(65) Prior Publication Data

US 2015/0156294 A1   Jun. 4, 2015

(30) Foreign Application Priority Data

Nov. 30, 2013   (CN) .......................... 2013 1 06229768

(51) Int. Cl.
| | | |
|---|---|---|
| *H04M 1/02* | (2006.01) | |
| *G06F 1/16* | (2006.01) | |
| *H04M 1/04* | (2006.01) | |
| *H04M 1/18* | (2006.01) | |

(52) U.S. Cl.
CPC .. *G06F 1/16* (2013.01); *H04M 1/04* (2013.01); *H04M 1/185* (2013.01)

(58) Field of Classification Search
CPC ........... G06F 1/16; H04M 1/04; H04M 1/185; H04M 1/0285; B65D 26/005; A63F 13/08
USPC ................ 455/550.1, 575.1, 575.8, 90.3, 351
See application file for complete search history.

(56) References Cited

U.S. PATENT DOCUMENTS

| | | | |
|---|---|---|---|
| 9,078,498 B2* | 7/2015 | Richardson ............ | A45C 11/00 |
| 2013/0003286 A1* | 1/2013 | Abe ........................ | A63F 13/08 361/679.31 |
| 2013/0220847 A1* | 8/2013 | Fisher ................... | B65D 25/005 206/216 |
| 2015/0181008 A1* | 6/2015 | Baschnagel ............ | H04M 1/04 455/575.1 |

\* cited by examiner

*Primary Examiner* — Thanh Le
(74) *Attorney, Agent, or Firm* — Novak Druce Connolly Bove + Quigg LLP

(57) ABSTRACT

Protecting device includes a main body and a removable cover. The main body receives an electronic device and includes a first holding member and a second holding member. The removable cover includes a first attaching portion, a first supporting portion, a second attaching portion and a second supporting portion. When the removable cover is located on a closed position, the first holding member holds the first attaching portion, or the second holding member holds the second attaching portion. When the removable cover is located on a first open position, the first holding member holds the first attaching portion, and the first supporting portion is configured to support the electronic device. When the removable cover is located on a second open position, the second holding member holds the second attaching portion, and the second supporting portion is configured to support the electronic device.

17 Claims, 7 Drawing Sheets

PROTECTING DEVICE FOR TABLET DEVICE

FIELD

The subject matter herein generally relates to a protecting device for a tablet device.

BACKGROUND

Tablet devices, such as tablet computers, are increasingly being used by consumers due to their portability and ease of use. Performing word processing on a touch-screen keyboard can be cumbersome and less efficient. Consumers desiring the word processing functionality of a laptop can choose to attach a physical keyboard to their tablet computer. Other consumers desire using their tablet computer for media purposes, such as playing games or viewing movies.

BRIEF DESCRIPTION OF THE DRAWINGS

Implementations of the present technology will now be described, by way of example only, with reference to the attached figures.

DETAILED DESCRIPTION

Figure 1:
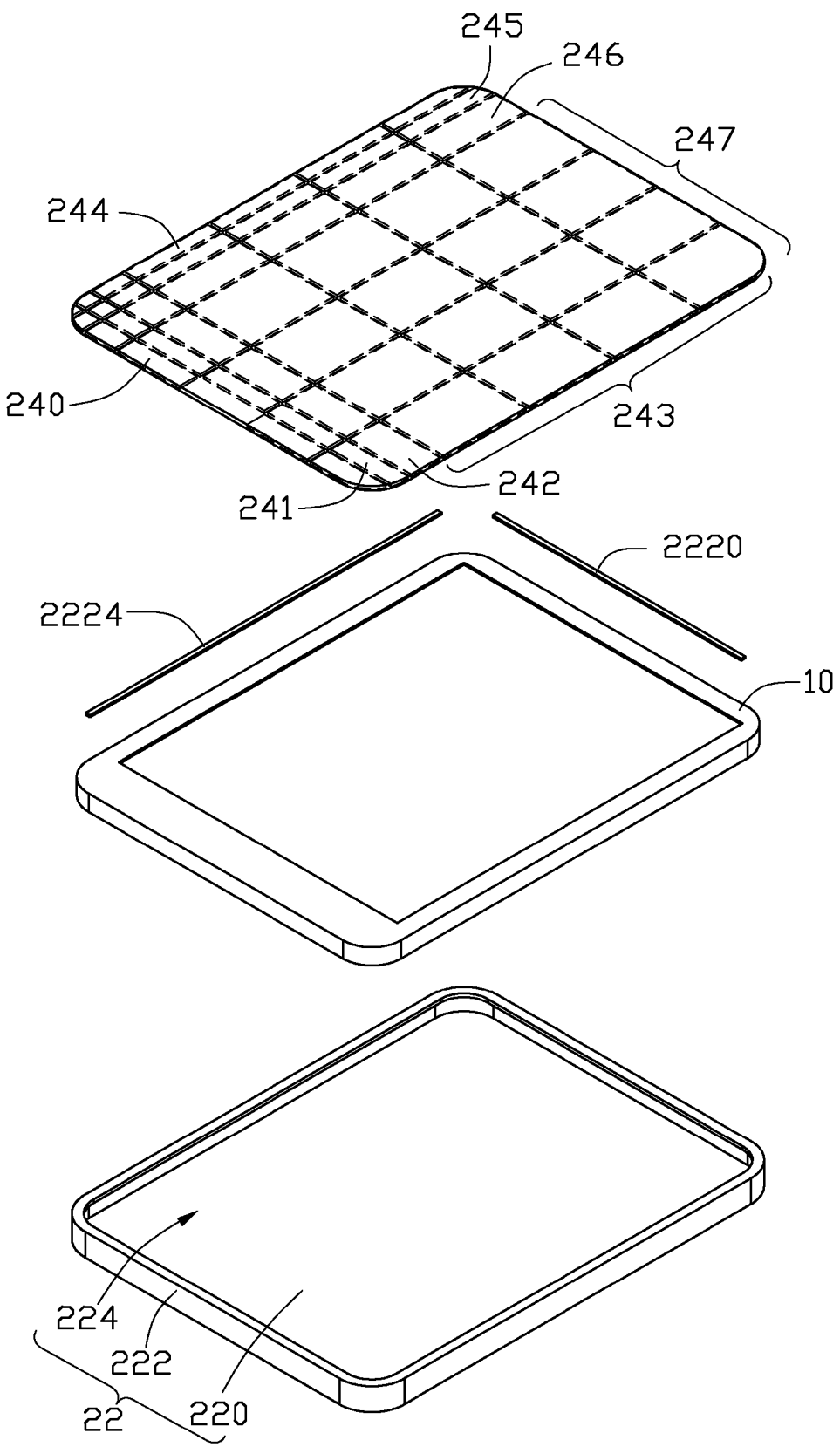
FIG. 1 is an exploded, isometric view of a protecting device in accordance with an embodiment

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a protecting device. The protecting device comprises a main body and a removable cover. The main body is configured to receive an electronic device and comprises a first holding member and a second holding member. The removable cover comprises a first attaching portion, a first supporting portion, a second attaching portion and a second supporting portion. When the removable cover is located on a closed position, the first holding member absorbs the first attaching portion, and the second holding member absorbs the second attaching portion. When the removable cover is located on a first open position, the first holding member absorbs the first attaching portion, and the first supporting portion is configured to support the electronic device. When the removable cover is located on a second open position, the second holding member absorbs the second attaching portion, and the second supporting portion is configured to support the electronic device.

Figure 2:
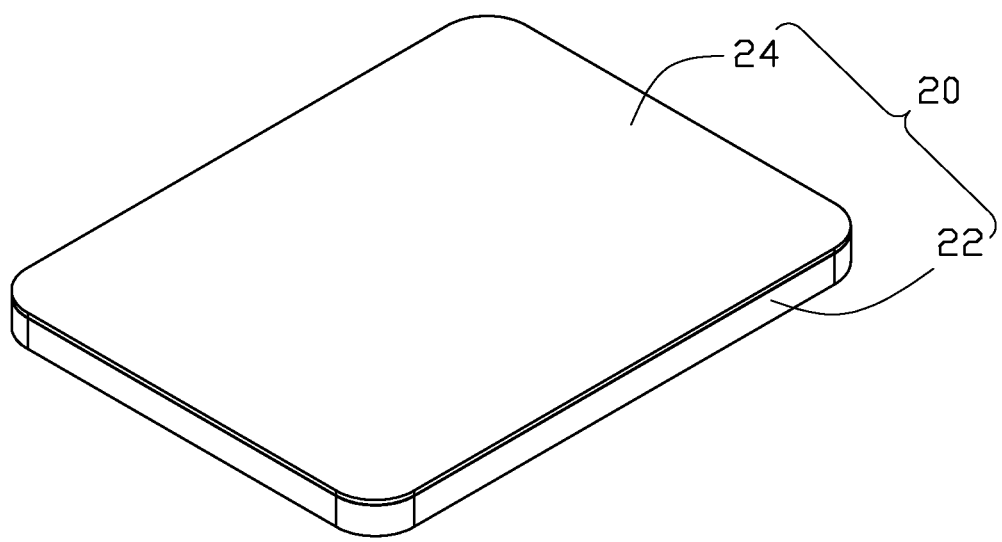
FIG. 2 is an assembled, isometric view of the protecting device of FIG. 1

FIGS. 1-2 illustrate an embodiment of a protecting device 20 configured to cover or support a tablet device 10. A cross-section of the tablet device 10 can be a rectangle and comprises four side edges. In at least one embodiment, the tablet device 10 can be a tablet display, a tablet computer or a tablet telephone.

The protecting device 20 can be a rectangle and comprises a main body 22 and a removable cover 24. In at least one embodiment, the protecting device 20 is plastic or anti-seismic. The main body 22 comprises a bottom panel 220 and four side panels 222 extending from four edges of the bottom panel 220 to define a receiving space 224 for receiving the electronic device. A first holding member 2220 and a second holding member 2224 can be attached to two adjacent side panels 222. That is, the first holding member 2220 can be substantially perpendicular to the second holding member 2224. In at least one embodiment, the first holding member 2220 and the second holding member 2224 can be magnets.

The removable cover 24 is substantially a rectangle. Along a first direction, the removable cover 24 can comprise a first attaching portion 240, a first connecting portion 241, a first resisting portion 242 and a first supporting portion 243. Along a second direction that is substantially perpendicular to the first direction, the removable cover 24 can comprise a second attaching portion 244, a second connecting portion 245, a second resisting portion 246 and a second supporting portion 247. Each portion of the removable cover 24 is intersected with other portion of the removable cover 24. The first attaching portion 240 and the second attaching portion 244 are magnets. The first connecting portion 241 is coupled to the first attaching portion 240 and the first resisting portion 242. A width of the first resisting portion 242 is substantially equal to a height of each side panel 222, so that the side panel 222 can be located on the first resisting portion 242. The first supporting portion 243 can be equally divided to four portions to permit the four portions to form a first isosceles triangle to support the electronic device 10. The second connecting portion 245 is coupled to the second attaching portion 244 and the second resisting portion 246. A width of the second resisting portion 246 is substantially equal to the height of each side panel 222, so that the side panel 222 can be located on the second resisting portion 246. The second supporting portion 247 can be equally divided to four portions to permit the four portions to form a second isosceles triangle to support the electronic device 10.

FIG. 2 illustrates the electronic device 10 is covered by the protecting device 20. When the electronic device 10 is covered, the first holding member 2220 absorbs the first attaching portion 240 or the second holding member 2224 absorbs the second attaching portion 244. Therefore, the protecting device 20 can protect the electronic device 10 therein.

Figure 3:
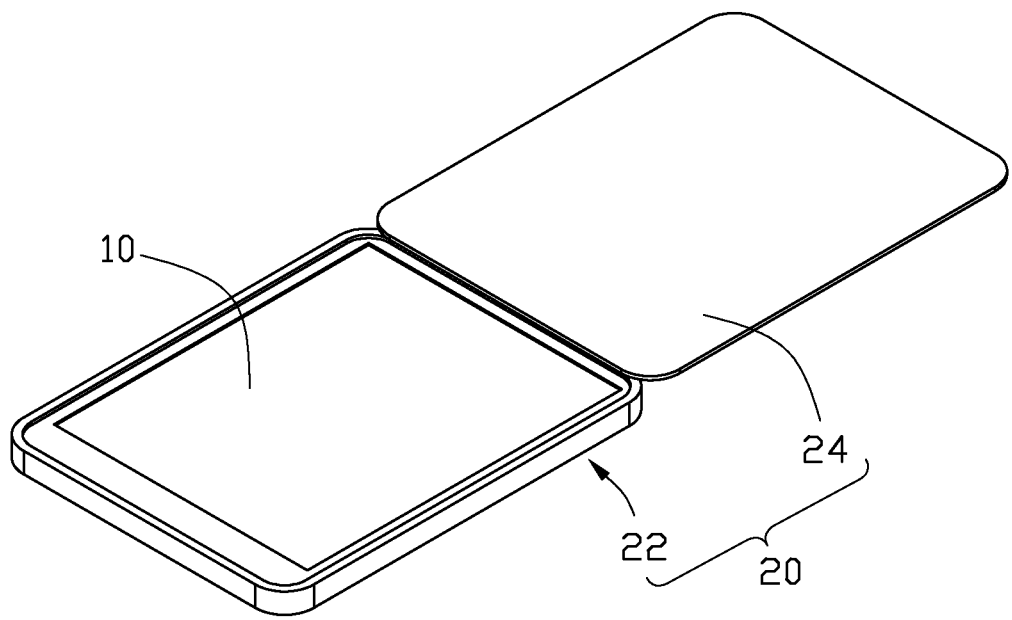
FIG. 3 is similar to FIG. 2, but a removable cover of the protecting device is open in a first position.
Figure 4:
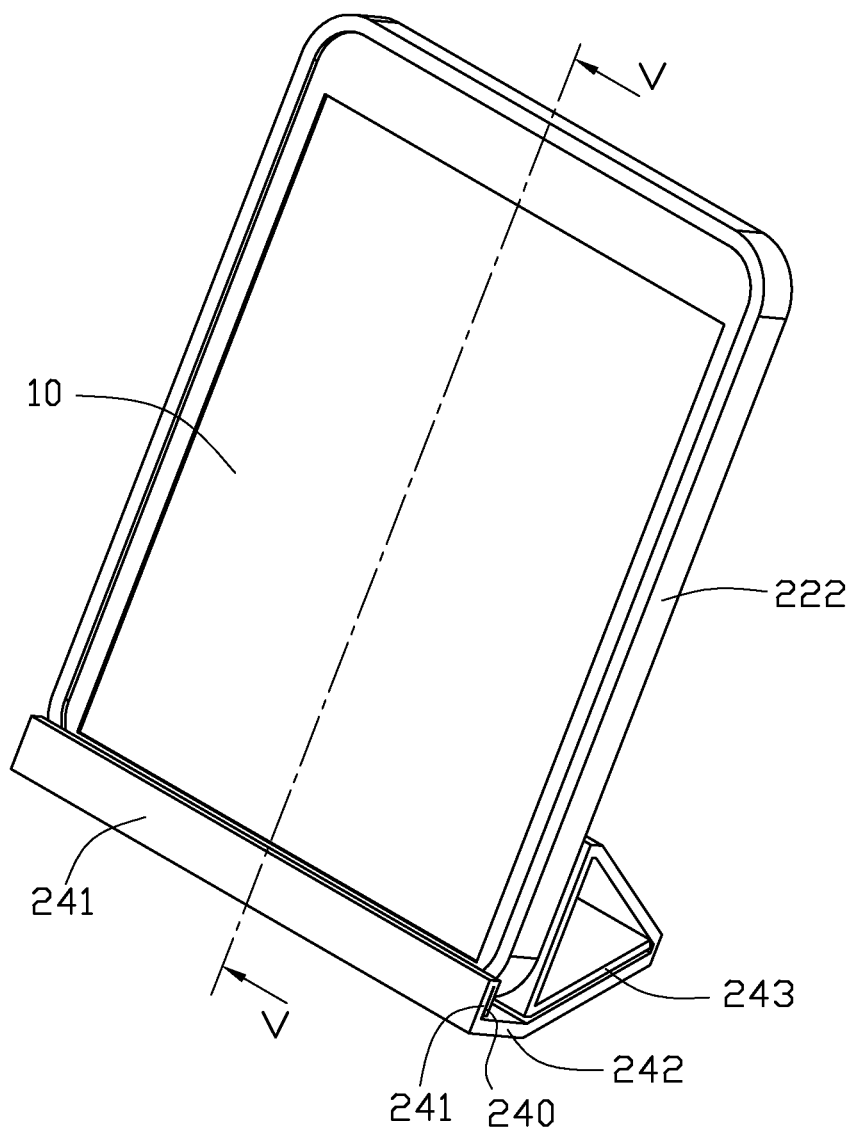
FIG. 4 is similar to FIG. 3, but the removable cover of the protecting device supports an electronic device in the first position.
Figure 5:
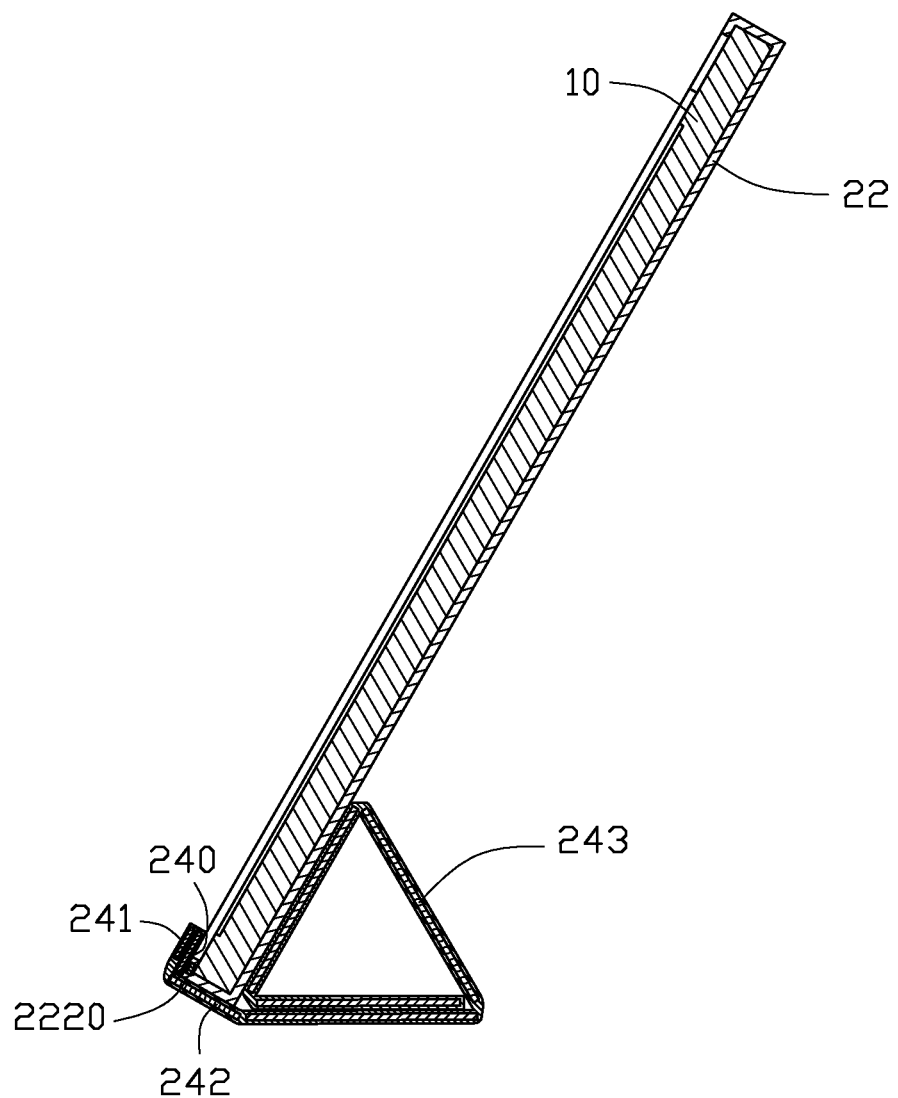
FIG. 5 is a cross-section view of FIG. 4, take along a line V-V.

FIGS. 3-5 illustrate the electronic device 10 is supported by the first supporting portion 243. The electronic device 10 is located in the main body 22. The first attaching portion 240 is attaching to the first holding member 2220, and the removable cover 24 is open on a first position. The first connecting portion 241 is bent relative to the first attaching portion 240 to abut the first attaching portion 240, such that the first connecting portion 241 is substantially parallel to the first attaching portion 240. The first resisting portion 242 abuts the first holding member 2220 and substantially perpendicular to the first connecting portion 241. The first supporting portion 243 is bent to form the first isosceles triangle to support on a back side of the electronic device 10. Thus, the electronic device 10 can be located on the first position by the removable cover 24. When the removable cover 24 is covered on the electronic device 10, the first holding member 2220 is attached to the first attaching portion 240.

Figure 6:
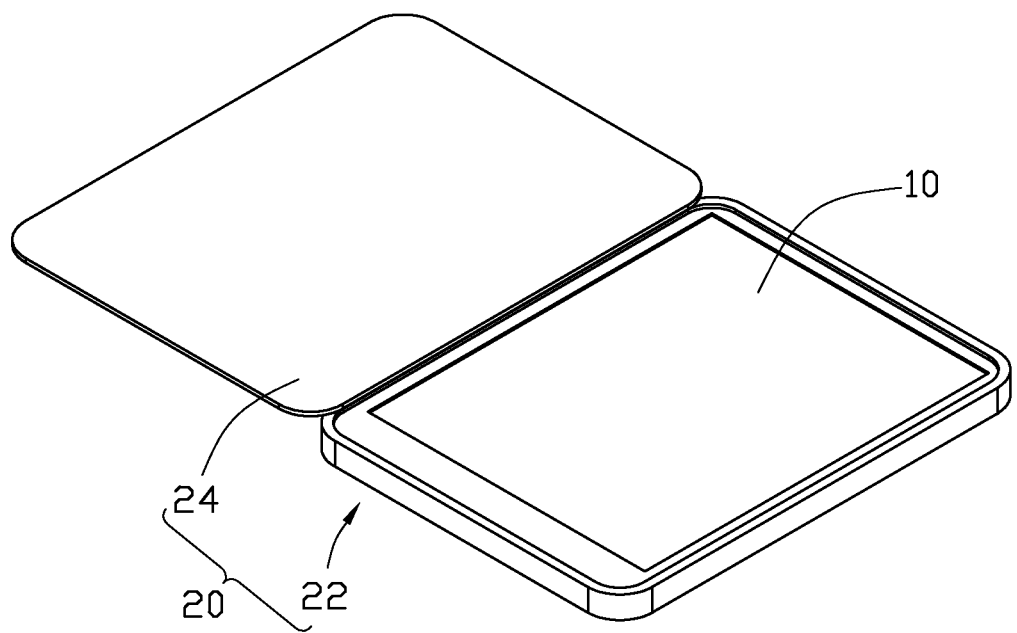
FIG. 6 is similar to FIG. 3, but the removable cover of the protecting device is open in a second position.
Figure 7:
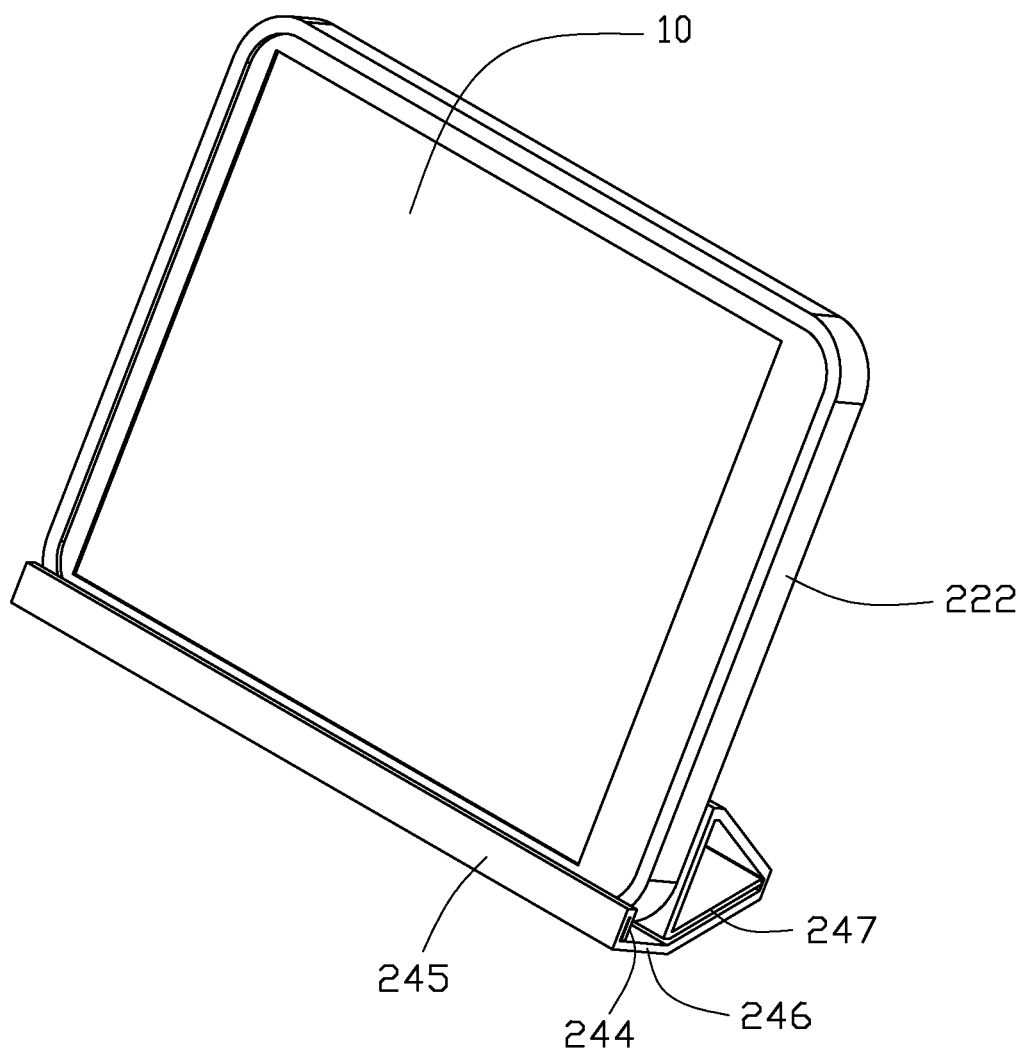
FIG. 7 is similar to FIG. 6, and the removable cover of the protecting device supports the electronic device in the second position.

FIGS. 6-7 illustrate the electronic device 10 is supported by the second supporting portion 247. The electronic device 10 is located in the main body 22. The second attaching portion 244 is attaching to the second holding member 2224, and the removable cover 24 is open on a second position. The second connecting portion 245 is bent relative to the second attaching portion 244 to abut the second attaching portion 244, such that the second connecting portion 245 is substantially parallel to the second attaching portion 244. The second resisting portion 246 abuts the second holding member 2224 and substantially perpendicular to the second connecting portion 245. The second supporting portion 247 is bent to form the second isosceles triangle to support on the back side of the electronic device 10. Thus, the electronic device 10 can be located on the second position by the removable cover 24. When the removable cover 24 is covered on the electronic device 10, the second holding member 2224 is attached to the second attaching portion 244.

The embodiments shown and described above are only examples. Many details are often found in the art such as the other features of a main body. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A protecting device comprising:
   a main body defining a cavity to receive an electronic device, the main body having a first side and a second side, the second side substantially perpendicular to the first side;
   a first holding member positioned along the first side of the main body;
   a second holding member positioned along the second side of the main body; and
   a removable cover, the removable cover having a first attaching portion and a first supporting portion along a first side of the removable cover, and a second attaching portion and a second supporting portion along a second side of the removable cover, the first attaching portion and the first supporting portion substantially parallel to each other and substantially perpendicular to the second attaching portion and the second supporting portion, with the second attaching portion substantially parallel to the second supporting portion,
   wherein, when the removable cover is covering the cavity, the first attaching portion is held by the first holding member or the second attaching portion is held by the second holding member;
   wherein, when the case is in a first open support position, the first attaching portion is held by the first holding member and the first supporting portion is configured to support the main body; and
   wherein, when the case is in a second open support position, the second attaching portion is held by the second holding member and the second supporting portion is configured to support the main body.

2. The protecting device of claim 1, wherein the removable cover further comprises a first connecting portion coupled to the first attaching portion, and when the removable cover is located on the first open position, the first connecting portion abuts the connecting portion.

3. The protecting device of claim 2, wherein the removable cover further comprises a first resisting portion coupled to the first connecting portion and the first supporting portion, and when the removable cover is located on the first open position, the resisting portion is substantially perpendicular to the first connecting portion and is configured to resist on the electronic device.

4. The protecting device of claim 1, wherein the first supporting portion is equally divided to four portions, and the four portions is configured to form a first isosceles triangle to support the electronic device.

5. The protecting device of claim 1, wherein the second supporting portion is equally divided to four portions, and the four portions is configured to form a second isosceles triangle to support the electronic device.

6. The protecting device of claim 1, wherein the removable cover further comprises a second connecting portion coupled to the second attaching portion, and when the removable cover is located on the second open position, the second connecting portion abuts the connecting portion.

7. The protecting device of claim 6, wherein the removable cover further comprises a second resisting portion coupled to the second connecting portion and the second supporting portion, and when the removable cover is located on the second open position, the resisting portion is substantially perpendicular to the second connecting portion and is configured to resist on the electronic device.

8. A protecting device comprising:
   a main body configured to receive an electronic device and comprising a first holding member and a second holding member substantially perpendicular to the first holding member; and
   a removable cover; the removable cover comprising a first attaching portion, a first supporting portion, a second attaching portion and a second supporting portion; the first attaching portion substantially perpendicular to the second attaching portion; the first holding member holding the first attaching portion to cover the electronic device therein, or the second holding member holding the second attaching portion to cover the electronic device therein;

wherein the removable cover is open between a first position, where the first holding member holds the first attaching portion, and the first supporting portion is configured to support the electronic device, and a second position; where the second holding member holds the second attaching portion, and the second supporting portion is configured to support the electronic device.

9. The protecting device of claim 8, wherein the first attaching portion and the first supporting portion are arranged at a first direction, and the second attaching portion and the second supporting portion are arranged at in a second direction that is substantially perpendicular to the first direction.

10. The protecting device of claim 8, wherein the removable cover further comprises a first connecting portion coupled to the first attaching portion, and when the removable cover is located on the first open position, the first connecting portion abuts the connecting portion.

11. The protecting device of claim 10, wherein the removable cover further comprises a first resisting portion coupled to the first connecting portion and the first supporting portion, and when the removable cover is located on the first open position, the resisting portion is substantially perpendicular to the first connecting portion and is configured to resist on the electronic device.

12. The protecting device of claim 8, wherein the first supporting portion is equally divided to four portions, and the four portions is configured to form a first isosceles triangle to support the electronic device.

13. The protecting device of claim 8, wherein the second supporting portion is equally divided to four portions, and the four portions is configured to form a second isosceles triangle to support the electronic device.

14. The protecting device of claim 8, wherein the removable cover further comprises a second connecting portion coupled to the second attaching portion, and when the removable cover is located on the second open position, the second connecting portion abuts the connecting portion.

15. The protecting device of claim 14, wherein the removable cover further comprises a second resisting portion coupled to the second connecting portion and the second supporting portion, and when the removable cover is located on the second open position, the resisting portion is substantially perpendicular to the second connecting portion and is configured to resist on the electronic device.

16. The protecting device of claim 8, wherein the main body further comprises two adjacent side panels, and the first holding member and the second holding member are attached to the two adjacent side panels.

17. The protecting device of claim 8, wherein the first holding member and the second holding member are magnets.

* * * * *